(12) United States Patent
Seymour et al.

(10) Patent No.: US 8,134,930 B2
(45) Date of Patent: Mar. 13, 2012

(54) METHODS OF PROVIDING DIGITAL DATA SERVICES INCLUDING COMPARING PREDICTED AND MEASURED LEVELS OF PERFORMANCE AND RELATED SYSTEMS AND COMPUTER PROGRAM PRODUCTS

(75) Inventors: James M. Seymour, Johns Creek, GA (US); Oussama Samih Zbib, Alpharetta, GA (US); Kenneth Wayne Hartsfield, Pinson, AL (US); Christopher R. Normand, Johns Creek, GA (US); Ping Song, Dunwoody, GA (US); Joan Tidwell Waldron, Trussville, AL (US); Jeffrey Neumann, Atlanta, GA (US); Steven C. Laufmann, Louisville, CO (US)

(73) Assignee: AT&T Intellectual Property I, L.P., Reno, NV (US)

( * ) Notice: Subject to any disclaimer, the term of this patent is extended or adjusted under 35 U.S.C. 154(b) by 640 days.

(21) Appl. No.: 11/931,015

(22) Filed: Oct. 31, 2007

(65) Prior Publication Data

US 2009/0109865 A1 Apr. 30, 2009

(51) Int. Cl.
*H04L 12/26* (2006.01)
(52) U.S. Cl. .............. 370/252; 370/395.41; 370/395.32; 370/395.21; 370/231
(58) Field of Classification Search .................. 370/252, 370/395.41, 395.32, 395.21
See application file for complete search history.

(56) References Cited

U.S. PATENT DOCUMENTS

| 6,292,468 | B1 | 9/2001 | Sanderson |
| 6,643,266 | B1 | 11/2003 | Pugaczewski |
| 6,870,899 | B2 | 3/2005 | Lu et al. |
| 7,020,246 | B2 | 3/2006 | Gao et al. |
| 7,113,482 | B1 | 9/2006 | Veeneman |
| 7,391,780 | B1 * | 6/2008 | Stone et al. ............. 370/395.41 |
| 2007/0124727 | A1 | 5/2007 | Tennyson et al. |
| 2008/0259810 | A1 * | 10/2008 | Diroo et al. ................... 370/252 |

* cited by examiner

*Primary Examiner* — Joe Cheng
*Assistant Examiner* — Khaled Kassim
(74) *Attorney, Agent, or Firm* — Myers Bigel Sibley & Sajovec, P.A.

(57) ABSTRACT

A method of providing digital data services between a communications service provider and a customer site over a communications loop may include predicting a level of performance of the communications loop without coupling a modem to the communications loop at the customer site to provide a predicted level of performance of the communications loop. The communications loop may be qualified for an initial qualified level of digital data service based on the predicted level of performance of the communications loop. After qualifying the communications loop, digital data service may be provided over the communications loop at the initial qualified level using a modem coupled to the communications loop at the customer site, and a measured level of performance of the communications loop may be obtained based on data communicated between the communications service provider and the modem over the communications loop. The measured level of performance may then be compared with the predicted level of performance. Related systems and computer program products are also discussed.

7 Claims, 3 Drawing Sheets

METHODS OF PROVIDING DIGITAL DATA SERVICES INCLUDING COMPARING PREDICTED AND MEASURED LEVELS OF PERFORMANCE AND RELATED SYSTEMS AND COMPUTER PROGRAM PRODUCTS

BACKGROUND

The present application relates generally to communications services and, more particularly, to digital data services and related methods, systems, and computer program products.

Voice telephone and high speed digital data service may be provided at a customer site (such as a residence) over a single communications loop (such as a twisted wire pair) between the customer site and a central office switch operated by a telephone service provider. Accordingly, communications loops originally provided for voice telephone service may now also provide high speed digital data service (e.g., digital subscriber line or DSL service). Because the communications loops were not originally provided with the intention of supporting high speed digital data service, high speed digital data service may be degraded by factors such as line length, taps, splices, electromagnetic interference (EMI), etc. Stated in other words, quality, speed, and/or availability of digital data service at different customer sites may vary due to differences in the respective communications loops providing service thereto.

Accordingly, the service provider may wish to predict an ability to provide digital data service at a customer site over a respective communications loop (such as a twisted wire pair) before actually attempting to provide digital data service to the customer site over the communications loop. If the service provider predicts that digital data service will not be available at the customer site (due to excessive line length, taps, splices, EMI, etc.), the service provider may reduce expense, time, and/or customer frustration that may otherwise result from an unsuccessful attempt to establish digital data service at the customer site. If the service provider predicts that only a lower speed digital data service will be available at the customer site, the service provider may reduce customer dissatisfaction by informing the client that only the lower speed digital data service will be available before setting the service up. If the service provider predicts that a highest speed digital data service will be available at the customer site, the customer may be offered a range of service speeds at a respective range of prices (e.g., with low speed digital data service being offered at relatively low prices, with intermediate speed digital data services being offered at intermediate prices, and with high speed digital data services being offered at relatively high prices). Stated in other words, a communications loop may be qualified for digital data service based on a prediction of a level of digital data service (if any) that should be available over the communications loop before providing the digital data service.

Qualification of a DSL communications loop is discussed, for example, in U.S. Pat. No. 7,113,482 to Veeneman entitled "Systems And Methods For Performing DSL Loop Qualification." As discussed in the Veeneman '482 patent, digital subscriber line (DSL) performance on an existing telephone communications loop may be predicted by obtaining a topological description of the existing telephone communications loop and identifying a loop equivalent to the existing telephone communications loop from the topological description of the existing telephone communications loop. DSL performance may then be determined for the equivalent loop. From the DSL performance for the equivalent loop, DSL performance for the existing telephone communications loop may be predicted. Loop qualification is also discussed in U.S. Pat. No. 7,020,246 to Gao et al., U.S. Pat. No. 6,870,899 to Lu et al, U.S. Pat. No. 6,643,266 to Pugaczewski, and U.S. Pat. No. 6,292,468 to Sanderson.

SUMMARY

According to some embodiments, methods of providing digital data services between a communications service provider and a customer site over a communications loop may include predicting a level of performance of the communications loop without coupling a modem to the communications loop at the customer site to provide a predicted level of performance of the communications loop. The communications loop may be qualified for an initial qualified level of digital data service based on the predicted level of performance of the communications loop. After qualifying the communications loop, digital data service may be provided over the communications loop at the initial qualified level using a modem coupled to the communications loop at the customer site, and a measured level of performance of the communications loop may be obtained based on data communicated between the communications service provider and the modem over the communications loop. In addition, the measured level of performance may be compared with the predicted level of performance.

If the measured level of performance is significantly greater than the predicted level of performance, the communications loop may be qualified for an enhanced qualified level of digital data service, and an option to switch to the enhanced qualified level at a higher speed than the initial qualified level may be offered to the customer at a higher price. If the measured level of performance is significantly less than the predicted level of performance, a service intervention to improve performance of the communications loop may be initiated. For example, the customer may be required to pay for a professional wiring upgrade at the customer site before digital data service is provided and/or upgraded, and/or the communications service provider may initiate service/repair of the communications loop between the customer site and the service provider.

A second communications loop may be provided between the communications service provider and a second customer site, and the first and second communications loops may be distributed from a same distribution terminal to the respective first and second customer sites. In addition, the second communications loop may be qualified based on the measured level of performance of the first communications loop based on data communicated between the communications service provider and the modem coupled to the first communications loop at the first customer site.

A second communications loop may be provided between the communications service provider and a second customer site, the first and second communications loops may be distributed from respective first and second distribution terminals to the respective first and second customer sites, and the first distribution terminal may be more distant from the communications service provider than the second distribution terminal. In addition, the second communications loop may be qualified based on the measured level of performance of the first communications loop based on data communicated between the communications service provider and the modem coupled to the first communications loop at the first customer site.

Predicting the level of performance of the communications loop may include predicting the level of performance based on a topological description of the communications loop. Moreover, the communications loop may include a twisted wire pair, and voice telephone communications may be provided over the communications loop between the communications service provider and the customer site. In addition, providing digital data service over the communications loop may include providing digital subscriber line (DSL) service over the communications loop.

According to other embodiments, a method of providing digital data services between a communications service provider and first and second customer sites over respective first and second communications loops may include providing digital data service over the first communications loop using a modem coupled to the first communications loop at the customer site. A measured level of performance of the first communications loop may be obtained based on data communicated between the communications service provider and the modem coupled to the first communications loop at the first customer site. A level of performance of the second communications loop may be predicted based on the measured level of performance of the first communications loop to provide a predicted level of performance of the communications loop, and the second communications loop may be qualified for an initial qualified level of digital data service based on the predicted level of performance of the second communications loop. After qualifying the second communications loop, digital data service may be provided over the second communications loop using a second modem coupled to the second communications loop at the second customer site.

The first and second communications loops may be distributed from a same distribution terminal to the respective first and second customer sites. The first and second communications loops may be distributed from respective first and second distribution terminals to the respective first and second customer sites with the first distribution terminal being more distant from the communications service provider than the second distribution terminal. With the first and second communications loops distributed from respective first and second distribution terminals, the first and second communications loops may physically traverse a same path between the communications service provider and the second distribution terminal.

The first and second communications loops may include respective first and second twisted wire pairs. Moreover, first voice telephone communications may be provided over the first communications loop between the communications service provider and the first customer site, and second voice telephone communications may be provided over the second communications loop between the communications service provider and the second customer site. In addition, providing digital data service over the first communications loop may include providing digital subscriber line (DSL) service over the first communications loop, and providing digital data service over the second communications loop may include providing digital subscriber line (DSL) service over the second communications loop.

According to still other embodiments, a method of providing digital data services between a communications service provider and a customer site over a communications loop may include predicting a level of performance of the communications loop based on a topological description of the communications loop to provide a predicted level of performance. Digital data service may be provided over the communications loop using a modem coupled to the communications loop at the customer site, and a measured level of performance of the communications loop may be obtained based on data communicated between the communications service provider and the modem over the communications loop. The measured level of performance may be compared with the predicted level of performance, and if the measured level of performance is significantly less than the predicted level of performance, a service intervention may be initiated to improve performance of the communications loop. For example, the customer may be required to pay for a professional wiring upgrade at the customer site before digital data service is provided and/or upgraded, and/or the communications service provider may initiate service/repair of the communications loop between the customer site and the service provider.

The communications loop may include a twisted wire pair, and voice telephone communications may be provided over the communications loop between the communications service provider and the customer site. Moreover, providing digital data service over the communications loop may include providing digital subscriber line (DSL) service over the communications loop.

According to more embodiments, a communications system providing digital data services for a customer site over a communications loop may include a bandwidth control system and a digital subscriber line access module. The bandwidth control system may be configured to predict a level of performance of the communications loop without coupling a modem to the communications loop at the customer site to provide a predicted level of performance of the communications loop, and to qualify the communications loop for an initial qualified level of digital data service based on the predicted level of performance of the communications loop. The digital subscriber line access module may be configured to provide digital data service over the communications loop at the initial qualified level using a modem coupled to the communications loop at the customer site after qualifying the communications loop. In addition, the bandwidth control system may be configured to obtain a measured level of performance of the communications loop based on data communicated between the communications service provider and the modem over the communications loop after qualifying the communications loop, and to compare the measured level of performance with the predicted level of performance.

According to still more embodiments, a communications system providing digital data services for first and second customer sites over respective first and second communications loops may include a bandwidth control system and a digital subscriber line access module. The digital subscriber line access module may be configured to provide digital data service over the first communications loop using a modem coupled to the first communications loop at the customer site. The bandwidth control system may be configured to obtain a measured level of performance of the first communications loop based on data communicated between the digital subscriber line access module and the modem coupled to the first communications loop at the first customer site. The bandwidth control system may be further configured to predict a level of performance of the second communications loop based on the measured level of performance of the first communications loop to provide a predicted level of performance of the communications loop, and to qualify the second communications loop for an initial qualified level of digital data service based on the predicted level of performance of the second communications loop. The digital subscriber line access module may be further configured to provide digital data service over the second communications loop using a second modem coupled to the second communications loop at the second customer site after qualifying the second communications loop.

According to yet more embodiments, a communications system providing digital data services for a customer site over a communications loop may include a bandwidth control system and a digital subscriber line access module. The bandwidth control system may be configured to predict a level of performance of the communications loop based on a topological description of the communications loop to provide a predicted level of performance. The digital subscriber line access module may be configured to provide digital data service over the communications loop using a modem coupled to the communications loop at the customer site. The bandwidth control system may be further configured to obtain a measured level of performance of the communications loop based on data communicated between the communications service provider and the modem over the communications loop, and to compare the measured level of performance with the predicted level of performance. If the measured level of performance is significantly less than the predicted level of performance, a service intervention may be initiated to improve performance of the communications loop. For example, the customer may be required to pay for a professional wiring upgrade at the customer site before digital data service is provided and/or upgraded, and/or the communications service provider may initiate service/repair of the communications loop between the customer site and the service provider.

According to other embodiments, a computer program product for providing digital data services between a communications service provider and a customer site over a communications loop may include a computer readable medium having computer readable program code embodied therein. The computer readable program code may include computer readable program code configured to predict a level of performance of the communications loop without coupling a modem to the communications loop at the customer site to provide a predicted level of performance of the communications loop. Computer readable program code may also be configured to qualify the communications loop for an initial qualified level of digital data service based on the predicted level of performance of the communications loop. In addition, computer readable program code may be configured to provide digital data service over the communications loop at the initial qualified level using a modem coupled to the communications loop at the customer site after qualifying the communications loop. Computer readable program code may be further configured to obtain a measured level of performance of the communications loop based on data communicated between the communications service provider and the modem over the communications loop after qualifying the communications loop, and to compare the measured level of performance with the predicted level of performance.

According to still other embodiments, a computer program product for providing digital data services between a communications service provider and first and second customer sites over respective first and second communications loops may include a computer readable medium having computer readable program code embodied therein. The computer readable program code may include computer readable program code configured to provide digital data service over the first communications loop using a modem coupled to the first communications loop at the customer site. Computer readable program code may also be configured to obtain a measured level of performance of the first communications loop based on data communicated between the communications service provider and the modem coupled to the first communications loop at the first customer site. In addition, computer readable program code may be configured to predict a level of performance of the second communications loop based on the measured level of performance of the first communications loop to provide a predicted level of performance of the communications loop. Computer readable program code may also be configured to qualify the second communications loop for an initial qualified level of digital data service based on the predicted level of performance of the second communications loop. Computer readable program code may be further configured to provide digital data service over the second communications loop using a second modem coupled to the second communications loop at the second customer site after qualifying the second communications loop.

According to yet other embodiments, a computer program product for providing digital data services between a communications service provider and a customer site over a communications loop may include a computer readable medium having computer readable program code embodied therein. The computer readable program code may include computer readable program code configured to predict a level of performance of the communications loop based on a topological description of the communications loop to provide a predicted level of performance. Computer readable program code may also be configured to provide digital data service over the communications loop using a modem coupled to the communications loop at the customer site. In addition, computer readable program code may be configured to obtain a measured level of performance of the communications loop based on data communicated between the communications service provider and the modem over the communications loop. In addition, computer readable program code may be configured to compare the measured level of performance with the predicted level of performance. Computer readable program code may be further configured to initiate a service intervention to improve performance of the communications loop if the measured level of performance is significantly less than the predicted level of performance. For example, the customer may be required to pay for a professional wiring upgrade at the customer site before digital data service is provided and/or upgraded, and/or the communications service provider may initiate service/repair of the communications loop between the customer site and the service provider.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification are taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be farther understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as methods, electronic devices, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Figure 1:
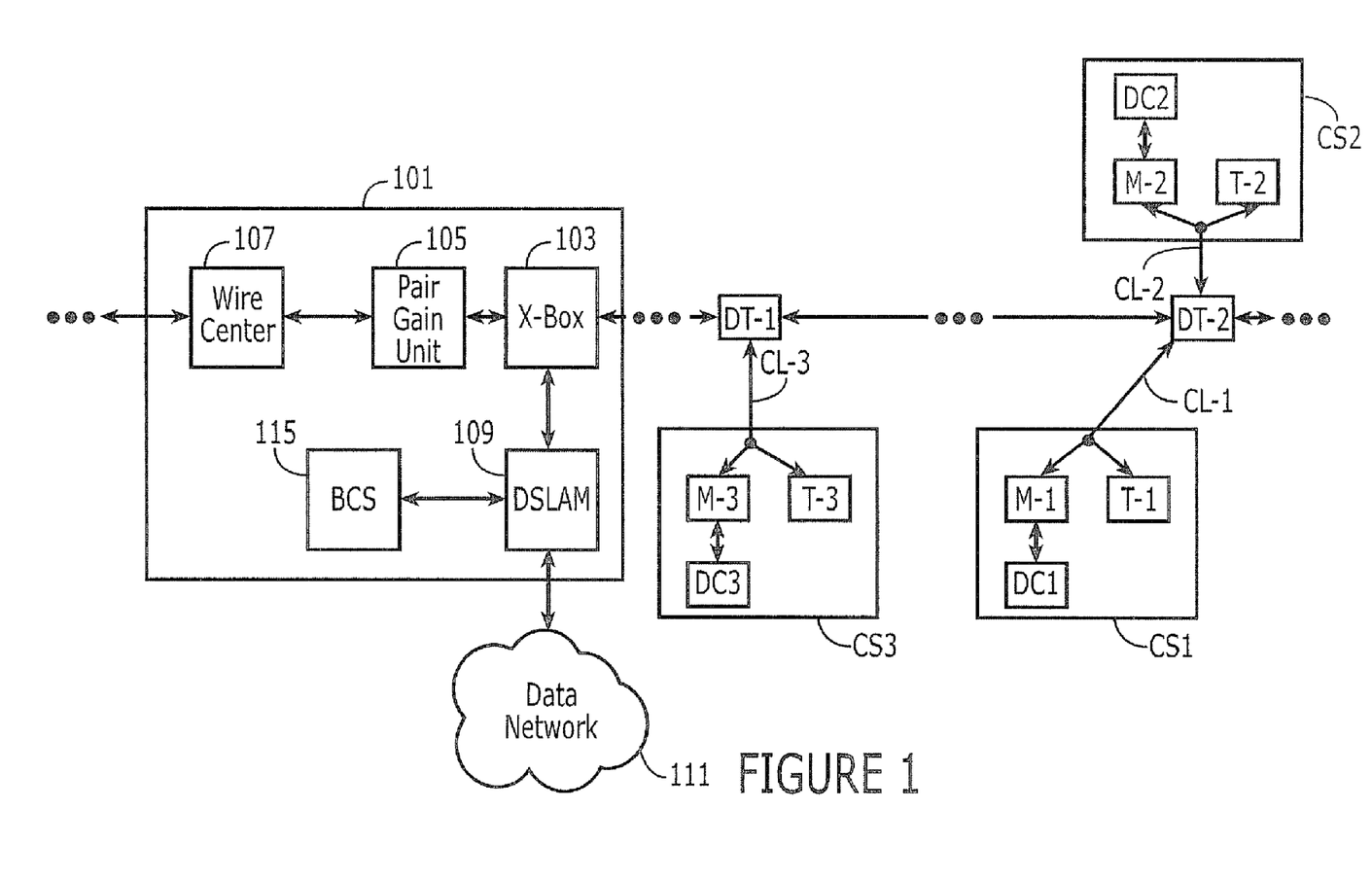
FIG. 1 is a block diagram of communications networks providing voice telephone and digital data services over communications loops according to embodiments of the present invention.

FIG. 1 is a block diagram of a communications network providing voice telephone and digital data communications services over communications loops according to embodiments of the present invention. As shown in FIG. 1, a communications service provider may operate a communications system 101 providing telephone service and/or digital data service (such as digital subscriber line or DSL service) over communication loops CL1-CL3 to respective customer sites CS1-CS3. More particularly, the communications system 101 may include an X-box 103 coupled between the communications loops CL1-CL3 and digital subscriber line access module (DSLAM) 109 providing coupling with a data network 111 such as the Internet. The X-box 103 may also be coupled between the communications loops CL1-CL3 and wire center 107 providing coupling with other voice telephone communications networks. Operations of some elements of communications system 101 are discussed in greater detail in U.S. Pat. No. 7,113,482 to Veeneman, U.S. Pat. No. 7,020,246 to Gao et al., U.S. Pat. No. 6,870,899 to Lu et al., U.S. Pat. No. 6,643,266 to Pugaczewski, U.S. Pat. No. 6,292,468 to Sanderson, and U.S. Patent Publication No. 2007/0124727 to Tennyson et al. Moreover, bandwidth control system 115 may be used to control/monitor operations of individual ports of DSLAM 109 coupled to respective communications loops CL to control levels of performance of digital data services provided over respective communications loops.

Each of the communications loops CL1-CL3 may provide electrical coupling between the X-Box 103 and the respective customer site CS1-CS3. More particularly, all of the communications loops CL1-CL3 may be provided along a same path between the X-Box 103 and a distribution terminal DT1, with the communications loop CL3 separating from the communications loops CL1 and CL2 at the distribution terminal DT1 for coupling with customer site CS3. Communications loops CL1 and CL2 may continue along a same path from distribution terminal DT1 to distribution terminal DT2, and the communications loops CL1 and CL2 may be separated at distribution terminal DT2 for coupling with respective customer sites CS1 and CS2. While not shown in FIG. 1, other communications loops may be provided from X-Box 103 through distribution terminals DT1 and DT2, and beyond the distribution terminal DT2 for separation at more distant distribution terminals not shown in FIG. 1. Moreover, additional communication loops (not shown) may be separated at the distribution terminals DT1 and DT2 for coupling with other customer cites (not shown).

More particularly, each of the communications loops CL1-CL3 may be a twisted wire pair, such as a twisted copper wire pair used for conventional voice telephone service. Moreover, electrical distances between the X-Box 103 and the distribution terminals DT1-2 and between the different distribution terminals may be relatively long, while electrical distances between distribution terminals and respective customer sites (e.g., between distribution terminal DT1 and customer site CS3, between distribution terminal DT2 and customer site CS1, or between distribution terminal DT2 and customer site CS2) may be relatively short (e.g., one or more orders of magnitude shorter than distances between distribution terminals). Electrical distances of communications loops CL1 and CL2 may thus be very similar, while electrical distances of communications loops CL1 and CL2 may be significantly greater than an electrical distance of communications loop CL3. Moreover, electrical characteristics of communications loops (e.g., communications loops CL1 and CL2) separated at a same distribution terminal (e.g., distribution terminal DT2)

may be similar (e.g., substantially the same) because the greatest lengths of these communications share a same path between the X-Box 103 and the distribution terminal from which they are separated.

The communications loops CL1 and CL2 are thus likely to share substantially the same and/or similar sources of performance degradation (e.g., line length, taps, splices, EMI, etc.) along the shared path and/or shared cables between the X-Box 103 and the distribution terminal DT2, while the communications loop CL3 is likely to have fewer sources of performance degradation. In other words, sources of performance degradation between the X-Box 103 and the distribution terminal DT1 would likely affect communications loops CL1, CL2, and CL3, while sources of performance degradation between the distribution terminals DT1 and DT2 would likely affect communications loops CL1 and CL2 but not communications loop CL3. Accordingly, a level of performance of digital data service available at customer site CS3 using communications loop CL3 can be expected to be greater than a level of performance of digital data service available at either of customer sites CS1 or CS2 using respective communications loops CL1 and CL2. Moreover, a level of performance of digital data service available at the customer sites CS1 or CS2 using respective communications loops CL1 and CL2 can be expected to be substantially the same and/or similar.

At each customer site, conventional voice telephone service can be provided using a telephone T coupled to the respective communications loop CL and/or digital data service (such as digital subscriber line or DSL service) may be provided using a modem M coupled to the respective communications loop CL. More particularly, a modem M (such as a DSL modem) may provide a coupling between a data communications device DC (such as a personal computer, a voice-over-internet-protocol or VoIP telephone, etc.) and the communications loop CL. Because conventional voice telephone services use significantly lower frequencies than digital data services, digital data services may be more susceptible to performance degradation than voice telephone services. Accordingly, a communications loop may need to be qualified for digital data services before installing a modem M for use with a data communications device DC at a customer site CS.

As used herein, the term modem is defined to include any device that modulates an analog carrier signal to encode digital information for transmission, and that also demodulates such a carrier signal to decode received information. A modem may thus provide a signal that can be transmitted easily over a communications loop and decoded to reproduce the original digital data. A modem M, for example, may be a cable modem, a digital subscriber line modem, a wireless or radio modem (such as a WIFI modem), an optical modem, etc. Accordingly, a communications loop may be a co-axial cable (for use with a cable modem), a twisted wire pair (for use with a digital subscriber line modem), a wireless or radio loop (for use with a wireless or radio modem), an optical fiber loop (for use with an optical modem), etc.

Figure 2:
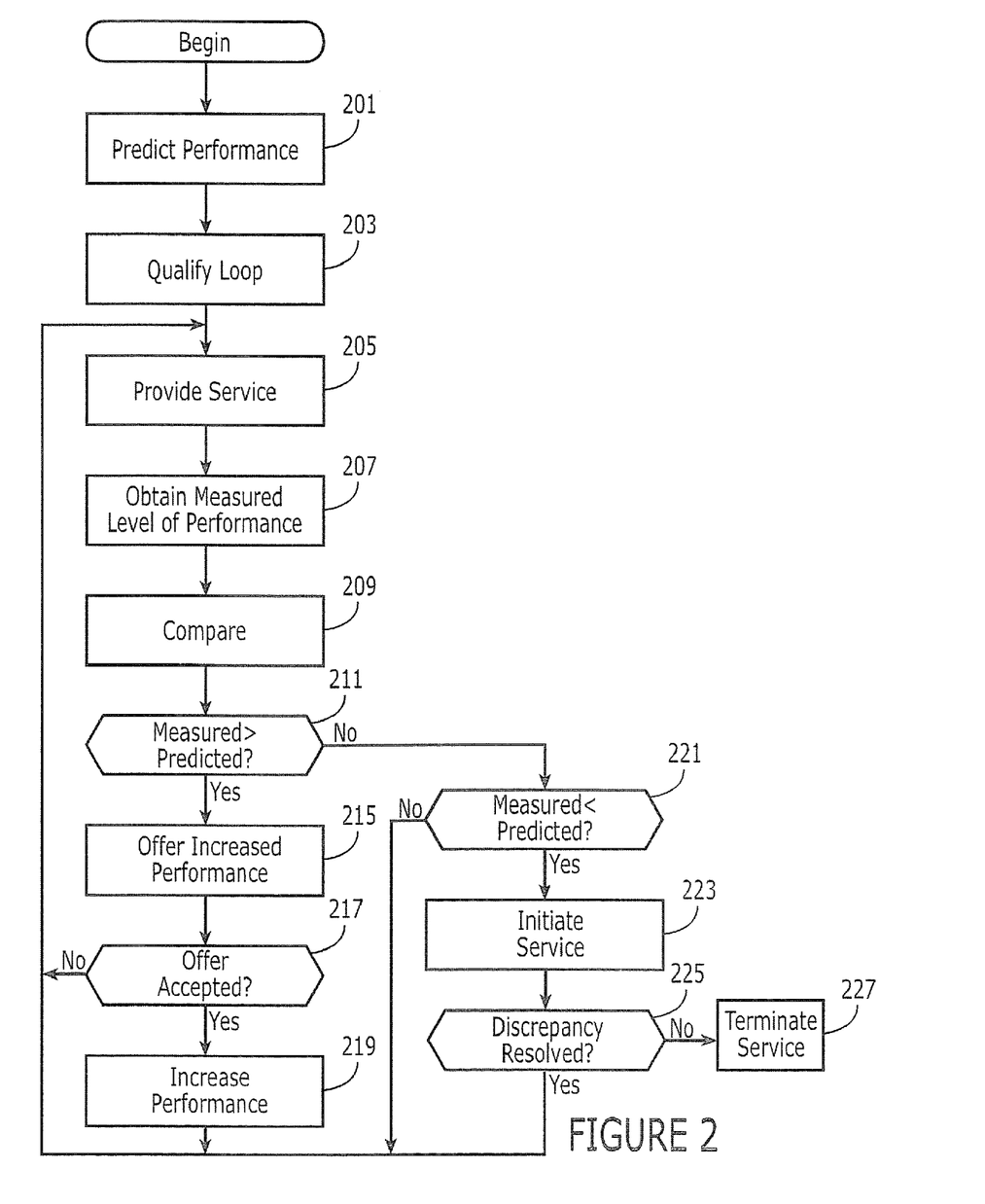
FIGS. 2-3 are flow charts illustrating operations providing communications according to embodiments of the present invention.
Figure 3:
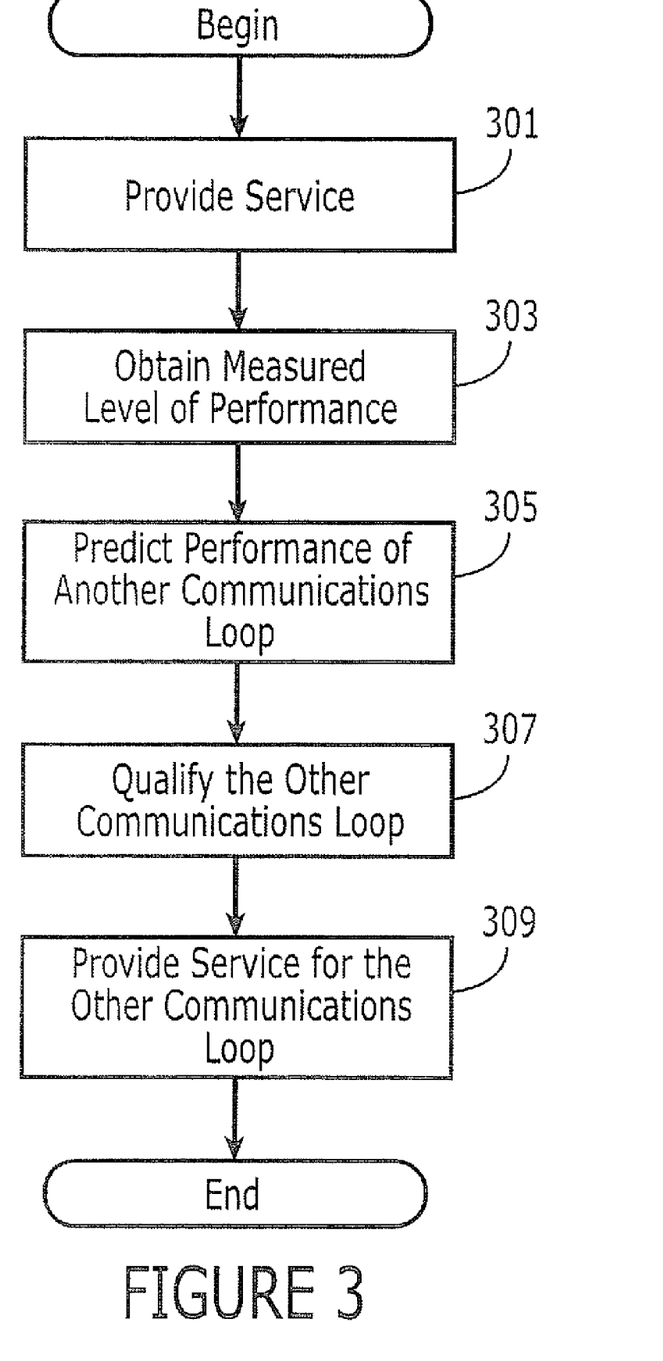

FIGS. 2-3 are flow charts illustrating operations of communications system 101 according to embodiments of the present invention. While an operation or operations of the flow charts may be discussed with respect to a particular block or blocks of FIG. 1, it will be understood that an operation may be performed by a block or blocks other than that identified. Moreover, the division of blocks illustrated in FIG. 1 is provided for purposes of illustration only, and it will be understood that different divisions are possible according to embodiments of the present invention.

When deciding whether to provide digital data service (such as DSL service) at customer site CS1 according to embodiments of the present invention, the modem M1 may not be installed. Accordingly, the communications system 101 may predict a level of performance of the communications loop CL1 without a modem being coupled to the communications loop CL1 at the customer site CS1 to provide a predicted level of performance of the communications loop CL1 at block 201. Performance of the communications loop CL1 may be predicted, for example, based on a topological description of the communications loop CL1. The topological description may be provided as loop length records (also referred to as records). The communications loop CL1 may then be qualified for an initial qualified level of digital data service at block 203 based on the predicted level of performance of the communications loop CL1. Prediction and qualification are discussed, for example, in U.S. Pat. No. 7,113,482, U.S. Pat. No. 7,020,246, U.S. Pat. No. 6,870,899, U.S. Pat. No. 6,643,266, and U.S. Pat. No. 6,292,468.

After qualifying the communications loop CL1 at block 203, the modem M1 may be installed, and digital data service may be provided over the communications loop CL1 at the initial qualified level using modem M1 coupled to the communications loop CL1 at the customer site CS1 at block 205. For example, a plurality of tiers of digital data service (e.g., different speeds) may be offered at respective prices (e.g., with higher speed data services being offered at higher prices and with lower speed data services being offered at lower prices). If the predicted level of performance of the communications loop CL1 indicates that the highest speed data services can be supported, the customer can be offered the full range of data services. If the predicted level of performance indicates that some higher speed data services cannot be supported, the customer should only be offered lower speed data services that can be supported. The modem M1 can thus be installed together with the data communications device DC1 to provide digital data communication between the modem M1 and the communications system 101 over the communications loop CL1.

Once the modem M1 is in communication with the communications system 101, a measured level of performance of the communications loop may be obtained based on data communicated between the communications system 101 and the modem M1 over the communications loop CL1 at block 207. A measured performance level for the communications loop CL1 may be obtained, for example, by incrementally adjusting parameters of a port of DSLAM 109 coupled to the communications loop CL1 and evaluating the resulting differences in performance as discussed in U.S. Patent Publication No. 2007/0124727. Results of these evaluations may be maintained at the Bandwidth Control System 115 as modem records.

More particularly, the BCS 115 may determine a steady state synchronization rate available for the communications loop CL1 based on data transmitted between the DSLAM 109 and the modem M1. The steady state synchronization may represent a measured level of performance for the communications loop CL1. Even though the steady state synchronization rate may exceed the previously predicted level of performance for the communications loop CL1, the DSLAM 109 may throttle data provided over the communications loop CL1 so as not to exceed the subscribed data rate for which the customer has subscribed (and paid).

The measured level of performance (such as the steady state synchronization rate) may then be compared with the predicted level of performance at block 209. If the measured level of performance is significantly greater than the predicted level of performance at block 211, the communications loop CL1 may be qualified for an enhanced qualified level of digital data service (i.e., higher speed), and the customer may be offered an option to switch to the enhanced qualified level at a higher speed than the initial qualified level as discussed below with respect to blocks 215, 217, and 219. If the measured level of performance is significantly less than the predicted level of performance at block 221, a service intervention (e.g., repair) may be initiated to improve performance as discussed below with respect to blocks 223, 225, and 227. For example, the customer may be required to pay for a professional wiring upgrade at the customer site before digital data service is provided and/or upgraded, and/or the communications service provider may initiate service/repair of the communications loop between the customer site and the service provider.

If the measured level of performance is significantly greater than the predicted level of performance, the communications loop CL1 may be qualified for an enhanced qualified level of digital data service, and a customer using the communication loop CL1 may be offered an option to switch to the enhanced qualified level of service (at a higher speed and price) at block 215. If the offer is accepted at block 217, the DSLAM 109 and/or the bandwidth control system 115 may be configured to provide the higher performance digital data service over the communications loop CL1 at block 219, and the higher performance digital data service may be provided for digital data communications between the modem M1 and the communications system 101 over the communications loop CL1 at block 205. Subsequent comparisons at blocks 209, 211, and 221 may compare measured performance with the current qualified level of service.

If the offer is not accepted at block 217, digital data service may be provided over the communications loop CL1 at the original qualified level of service at block 205 even though a faster service is available. The customer, for example, may choose to maintain the original lower speed service at the original lower price.

If the measured level of performance is significantly less than the predicted level of performance at block 221, a service intervention may be initiated to improve performance of the communications loop CL1. The discrepancy in predicted and measured levels of performance may be indicative of a problem (e.g., with the communications loop CL1, with the modem M1, and/or with the communications system 101) that may require correction. If the discrepancy between the measured and predicted levels of performance can be resolved at block 225 (e.g., by repair and/or replacement of one or more components), digital data service may continue to be provided at block 205. If the discrepancy cannot be resolved at block 225, the current digital data service provided over the communications loop CL1 may need to be terminated at block 227. If communications loop CL1 can support a lower speed digital data service, the customer using the communications loop CL1 may be offered an option to subscribe at the lower speed service at a lower price.

At block 223, the communications service provider may use any number of diagnostic/repair techniques to resolve the discrepancy between the measured and predicted levels of performance on the communications loop CL1. For example, measured levels of performance of other communications loops (e.g., communications loops CL2 and CL3) may be compared with the measured level of performance of the communications loop CL1 to isolate the source of the discrepancy. If the measured level of performance of the communications loop CL1 is significantly less than that of the communications loop CL2 separated at the same distribution terminal DT2, the discrepancy is likely due to a problem with a portion of the communications loop CL1 between the distribution terminal DT2 and the customer site CS1, a problem with a portion of the communications loop CL1 in the customer site CS1, a problem with the modem M1, and/or a problem with a component of the communications system (e.g., a particular port of the DSLAM 109 and/or X-Box 103) specifically associated with the communications loop CL1.

If the measured level of performance of the communications loop CL1 is not significantly different than that of the communications loop CL2 separated at the same distribution terminal DT2, the discrepancy is likely due to a problem with the communications loop between the distribution terminal DT2 and the communications system 101. Further isolation may be provided by comparing the similar measured levels of performance of the communications loops CL1 and CL2 with a measured level of performance of the communications loop CL3 separated at distribution terminal DT1 between the distribution terminal DT2 and the communications system 101. If the measured levels of performance of the communications loops CL1 and CL2 are significantly below expectations, but a measured level of performance of the communications loop CL3 is at or above expectation, the discrepancies are likely due to a problem common to portions of communications loops CL1 and CL2 between the distributions terminals DT1 and DT2. If the measured levels of performance of the communications loops CL1, CL2, and CL3 are all below expectations, the discrepancy is likely due to a problem common to portions of communications loops CL1, CL2, and CL3 between the distributions terminals DT1 and the communications system 101 and/or with a component of the communications system 101 commonly associated with all three communications loops CL1, CL2, and CL3 (e.g., the DSLAM 109 and/or bandwidth control system 115). Stated in other words, correlations of low performing communications loops may be used to identify a cable (including portions of a plurality of communications loops) requiring repair, a noise source, etc.

As discussed above with respect to FIGS. 1 and 2, a predicted level of performance may be used to initially qualify a communications loop to provide up to a certain level (e.g., speed) of digital data service. Moreover, once the digital data service has been initiated, the predicted level of performance may be compared with a measured level of performance. If the measured level of performance is significantly greater than the predicted level of performance, the customer may be offered a higher level (e.g., higher speed) of digital data service at a higher price. If the measured level of performance is significantly less than the predicted level of performance, the communications service provider may initiate a service intervention to perform maintenance and/or repair. For example, the customer may be required to pay for a professional wiring upgrade at the customer site before digital data service is provided and/or upgraded, and/or the communications service provider may initiate service/repair of the communications loop between the customer site and the service provider.

In addition, once a measured level of performance (e.g., a steady state synchronization rate) is known for one communications loop, that measured level of performance may be used to qualify other communications loops that may be expected to provide the same or better performance as discussed below with respect to FIG. 3. Stated in other words, a known (e.g., measured) level of performance for one loop may be inferred to other similar loops. In particular, digital data service may be provided over a first communications loop CL1 using modem M1 coupled to the communications loop CL1 at the customer site CS1 at block 301 of FIG. 3. At block 303 of FIG. 3, a measured level of performance of digital data service provided over the first communications loop CL1 may be obtained, and the measured level of performance may be based on data communicated between the communications service provider 101 and the modem M1 coupled to the first communications loop CL1 at the customer site CS1. Digital data service may be provided over the first communications loop CL1 and performance thereof may be measured, for example, as discussed above with respect to FIGS. 1 and 2.

At block 305 of FIG. 3, a level of performance of a second communications loop (e.g., communications loop CL2 or CL3) may be predicted (e.g., inferred) based on the measured level of performance of the first communications loop CL1 to provide a predicted level of performance of the second communications loop. The second communications loop (e.g., communications loop CL2 or CL3) may then be qualified for an initial qualified level of digital data service based on the predicted level of performance of the second communications loop (e.g., communications loop CL2 or CL3) at block 307. After qualifying the second communications loop (e.g., communications loop CL2 or CL3), digital data service may be provided over the second communications loop (e.g., communications loop CL2 or CL3) using a modem (e.g., modem M2 or M3) coupled to the second communications loop at block 309.

The communications loop CL1 and the communications loop CL2 may be distributed from a same distribution terminal DT2 to the respective customer sites CS1 and CS2. The communications loops CL1 and CL2 may thus be expected to provide substantially the same or similar levels of performance because both traverse the same path between the communications system 101 and the distribution terminal DT2 that accounts for the greatest portions of both communications loops. Accordingly, it is reasonable to expect that substantially the same level of performance measured over the communication loop CL1 should be available over the communications loop CL2.

The communications loop CL3 is distributed from the distribution terminal DT1 that is electrically closer to the communications system 101 than the distribution terminal DT2 (from which the communications loop CL1 is distributed). Moreover, the greatest portion of communications loop CL3 traverses the path between distribution terminal DT2 and communications system 101 that is shared with portions of communications loop CL1 between distribution terminal DT2 and communications system 101. Communications loop CL3 may thus be expected to provide a similar or better level of performance than communications loop CL1, because the modem M3 (coupled to the communication loop CL3) is electrically closer to the communications system 101. Accordingly, it is reasonable to expect that at least the same level of performance measured over communication loop CL1 (or better) should be available over communications loop CL3.

Many variations and modifications can be made to the embodiments without substantially departing from the principles of the present invention. All such variations and modifications are intended to be included herein within the scope of the present invention, as set forth in the following claims.

That which is claimed:

1. A method of providing a digital data service between a communications service provider and a first customer site over a first communications loop, the method comprising:
predicting a level of performance of the first communications loop based on a topological description of the first communications loop without coupling a modem to the first communications loop at the customer site to provide a predicted level of performance of the first communications loop;
qualifying the first communications loop for an initial qualified level of digital data service at an initial subscribed data rate based on the predicted level of performance of the first communications loop;
after qualifying the first communications loop, providing digital data service over the first communications loop at the initial qualified level and at an initial subscribed price using a modem coupled to the first communications loop at the first customer site wherein providing the digital data service at the initial qualified level includes throttling the digital data service so as not to exceed the initial subscribed data rate;
after qualifying the first communications loop, obtaining a measured level of performance of the first communications loop based on data communicated between the communications service provider and the modem over the first communications loop, comprising incrementally adjusting parameters of a port of a digital subscriber line access multiplexer coupled to the first communications loop;
comparing the measured level of performance with the predicted level of performance for the first communications loop between the communications service provider and the first customer site wherein the predicted level of performance is predicted without coupling the modem to the first communications loop;
if the measured level of performance is significantly greater than the predicted level of performance, qualifying the first communications loop for an enhanced qualified level of digital data service, and offering an option to switch to the enhanced qualified level at a higher data rate exceeding the initial subscribed data rate at an enhanced subscriber price exceeding the initial subscribed price; and
if the measured level of performance is significantly less than the predicted level of performance, initiating a service intervention to improve performance of the first communications loop.

2. The method according to claim 1 wherein a second communications loop is provided between the communications service provider and a second customer site, wherein the first and second communications loops are distributed from a same distribution terminal to the respective first and second customer sites, the method further comprising:
qualifying the second communications loop based on the measured level of performance of the first communications loop based on data communicated between the communications service provider and the modem coupled to the first communications loop at the first customer site.

3. The method according to claim 1 wherein a second communications loop is provided between the communications service provider and a second customer site, wherein the first and second communications loops are distributed from respective first and second distribution terminals to the respective first and second customer sites, wherein the first distribution terminal is more distant from the communications service provider than the second distribution terminal, the method further comprising:
qualifying the second communications loop based on the measured level of performance of the first communications loop based on data communicated between the communications service provider and the modem coupled to the first communications loop at the first customer site.

4. The method according to claim 1 wherein the first communications loop comprises a twisted wire pair.

5. The method according to claim 1 further comprising:
providing voice telephone communications over the first communications loop between the communications service provider and the first customer site.

6. The method according to claim 1 further comprising:
responsive to receiving an acceptance of the option to switch to the enhanced qualified level of digital data service at the communications service provider, providing digital data service over the first communications loop at the enhanced qualified level at the higher data rate exceeding the initial subscribed data rate at the enhanced subscribed price.

7. The method according to claim 6 further comprising:
responsive to receiving acceptance of the option to switch to the enhanced qualified level of digital data service, initiating billing for the first communications loop at the enhanced subscribed price.

* * * * *